DE WITT C. THOMAS.
Potato-Diggers.

No. 127,937.  Patented June 11, 1872.

Witnesses:

Inventor:
De Witt C. Thomas
by
Attorneys.

UNITED STATES PATENT OFFICE.

DE WITT C. THOMAS, OF EASTON, NEW YORK.

IMPROVEMENT IN POTATO-DIGGERS.

Specification forming part of Letters Patent No. 127,937, dated June 11, 1872.

Specification describing an Improved Potato-Digger, invented by DE WITT C. THOMAS, of Easton, in the county of Washington and State of New York.

The invention consists, first, in spading the potatoes from a row, together with their surrounding soil, and transferring both dirt and potatoes over the axle and upon a rotating sieve, by which they are separated and the potatoes emptied in the rear or into a receptacle there placed to receive them. Secondly, it consists in combining with a rotary digger a subjacent plow, that mellows the ground in advance of the spades. Thirdly, it consists in mechanism by which all the parts are raised, lowered, locked or unlocked simultaneously, and by the driver. Fourthly, it consists in side guards to retain the potatoes on the sieve and compel them to be discharged in a straight line behind the digger.

Figure 1:
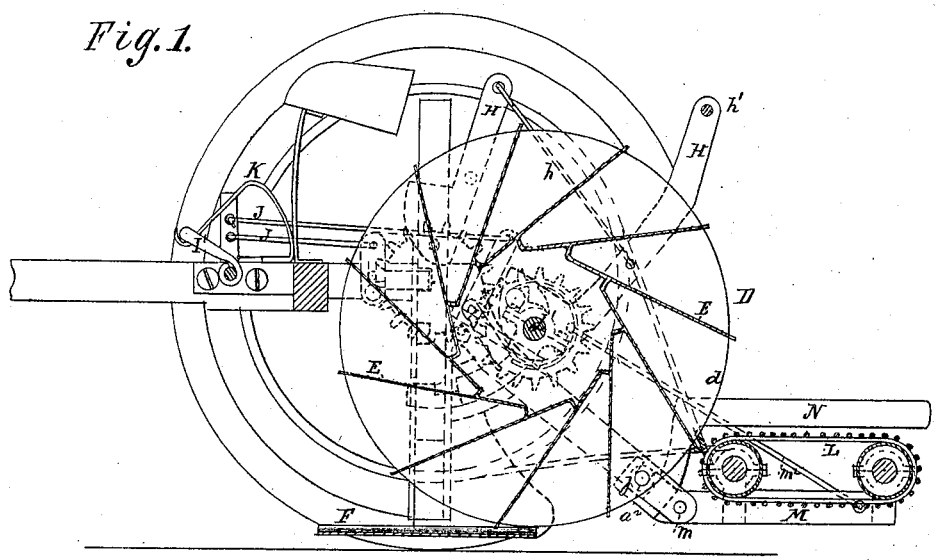
Figure 3:
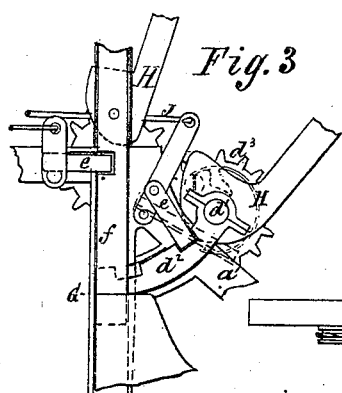
Figure 2:
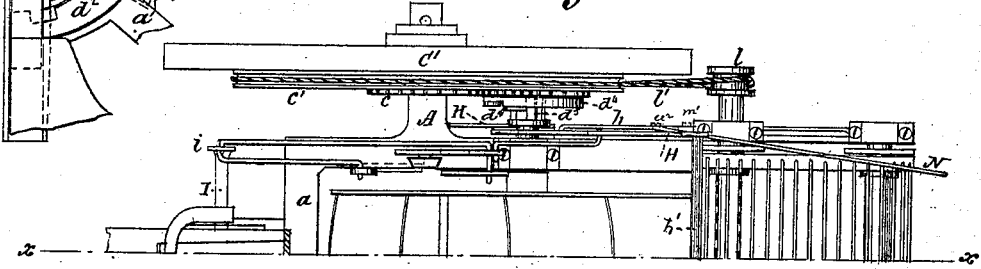
Figure 4:
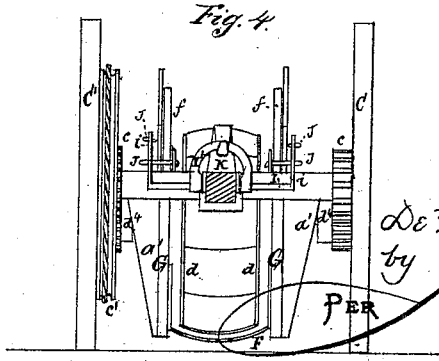

Figure 1 is a vertical longitudinal section in the line $x\ x$, Fig. 2. Fig. 2 is a plan of one half of the machine. Fig. 3 is a front elevation; and Fig. 4 is a detail view, showing the locking device.

A represents the axle, having bow $a$ in front, to which is attached the pole or tongue and the rear and downwardly-inclined projections $a^1\ a^1$. C C are loose wheels, having on their bosses the spur-wheels $c\ c$, while C' has also the pulley $c'$ on its inside. D is the digger, formed of two parallel disks, $d\ d$, conjoined by the slightly-protruding non-radial and inclined spades E. The shaft $d^1$ of the digger is arranged in notched movable bearing-pieces $d^2$, and has on each end a loose spur-wheel, $d^3$, that gears with wheels $c\ c$ on axle, and by a pawl, $d^4$, carries a ratchet, $d^5$, that is fast on axle. F is a plow, used in hard ground to break and pulverize the soil before it is removed and carried over by the spades. It is arranged in notched arms $f\ f$, which slide up and down in the grooves or guides G G. To each of the arms $f\ f$, and to each side of shaft $d^1$, is attached a cam-lever H, which, being depressed, raises the plow and digger off the ground. $e\ e$ are sliding latches that lock the arms which carry digger and plow by entering the notches thereof. These cam-levers are connected together by rods $h\ h$, and operated by the hand applied to the cross-bar $h'$. I is a rock-shaft, having the vertical arms $i\ i$, in which are fastened rods J that connect with latches $e\ e$. This shaft has a yoke, I', which is held up by a spring, K, and thus keeps the digger and plow locked. When it is desired to unlock these parts the foot of driver is pressed upon the yoke, which withdraws the latches. The driver then moves the cross-bar to raise or depress the digger or plow as he desires. L is an endless carrier arranged on frame M, pivoted at $m\ m$ on the projections $a^1\ a^1$ of axle, and held in a horizontal plane by the stop-pins $a^2\ a^2$, which enter notches $m^1\ m^1$ on ends of frame M. This frame M is connected by rods $m^2\ m^2$ to the cam-levers H, so that it will always be turned on its fulcrum $m\ m$ and elevated at the same time with digger. N N are guards, placed one on each side of and a little above the endless carrier to prevent the potatoes from falling to either side. The carrier is provided with a drive-pulley, $l$, which is connected by belt $l'$ with the pulley on large wheels.

The operation is as follows: The horses and wheels move in a furrow on each side of the row of potatoes that is to be dug, while the two disks, which are a little further apart than the row is wide, are in close proximity thereto. This allows the spades to gather the potatoes with the loose dirt that surrounds them, while the wheel transfers both in a circle over and upon the endless sieve-carrier. This carrier sifts the dirt from them, and discharges them in a row behind or into a receptacle suitably placed to receive them. If, however, the ground is baked by a drouth or rendered hard from other causes, I attach the projecting plow, which goes deeper than the potatoes, and breaks and pulverizes the soil in advance of the spades.

Having thus described my invention, what I claim as new, and desire to secure by Letters Patent, is—

1. A rotary potato-digger, D, consisting of the two parallel disks $d\ d$ and series of straight non-radial spades E, constructed and arranged to operate as and for the purpose described.

2. The combination, with rotary digger D $d$ E, of the endless sieve and carrier L, arranged in the rear thereof, as and for the purpose set forth.

3. The plow F, arranged horizontally under and in combination with a rotary digger, as and for the purpose described.

4. The mechanism described for locking, unlocking, and elevating or depressing the digger, carrier, and spade, substantially as set forth.

5. The oblique spring-guard N N, arranged one on each side and a little above the sifter and carrier, as and for the purpose described.

6. The combined axle and frame, consisting of the axle A having bow $a$ in front, and downwardly-inclined projections $a^1$ $a^1$ and guides G, as and for the purpose set forth.

DE WITT C. THOMAS.

Witnesses:
SOLON C. KEMON,
THOS. D. D. OURAND.